(12) United States Patent
Moine (10) Patent No.: US 11,964,355 B2
(45) Date of Patent: Apr. 23, 2024

(54) METHOD OF DETERMINING THE POSITION OF AN OPTICAL LENS MEMBER

(71) Applicant: Essilor International, Charenton-le-Pont (FR)

(72) Inventor: Jérôme Moine, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1161 days.

(21) Appl. No.: 16/623,895

(22) PCT Filed: Jul. 30, 2018

(86) PCT No.: PCT/EP2018/070565
§ 371 (c)(1),
(2) Date: Dec. 18, 2019

(87) PCT Pub. No.: WO2019/025352
PCT Pub. Date: Feb. 7, 2019

(65) Prior Publication Data
US 2021/0146495 A1    May 20, 2021

(30) Foreign Application Priority Data
Aug. 2, 2017  (EP) ..................................... 17306029

(51) Int. Cl.
*B24B 13/005* (2006.01)
*B24B 47/22* (2006.01)
*B29D 11/00* (2006.01)

(52) U.S. Cl.
CPC ........ *B24B 13/0055* (2013.01); *B24B 47/225* (2013.01); *B29D 11/00028* (2013.01); *B29D 11/00961* (2013.01); *B29D 11/0098* (2013.01)

(58) Field of Classification Search
CPC ............. G01M 11/0221; B24B 13/005; B24B 13/0055; B24B 47/225; B29D 11/00028; B29D 11/00961; B29D 11/0098
See application file for complete search history.

(56) References Cited

U.S. PATENT DOCUMENTS

| 4,714,232 A | 12/1987 | Blot |
| 2015/0331256 A1* | 11/2015 | Baudart ................ B24B 13/005 |
| | | 351/159.73 |

(Continued)

FOREIGN PATENT DOCUMENTS

| WO | WO 2014/102385 | 7/2014 |
| WO | WO 2014/131878 | 9/2014 |
| WO | WO 2014/131879 | 9/2014 |

OTHER PUBLICATIONS

International Search Report, PCT/EP2018/070565, dated Nov. 9, 2018.
Written Opinion, PCT/EP2018/070565, dated Nov. 9, 2018.

*Primary Examiner* — Michael A Lyons
(74) *Attorney, Agent, or Firm* — NIXON & VANDERHYE (57) ABSTRACT

Disclosed is a method implemented by a computer, for determining the position of an optical lens member having a surface placed on a lens blocking ring, the blocking ring including a bearing zone arranged to bear at least partially a placed known surface of the optical lens member when the known surface of the optical lens member is placed on the lens blocking ring and hold by a force applied on the optical lens member, the method includes finding a trio of points of the bearing zone that forms a triangle including the projection on the main plane of the point of application of the force; and a position of the optical lens having a virtual contact between the placed known surface and the ring at the location of the trios of points.

19 Claims, 3 Drawing Sheets

(56) References Cited

U.S. PATENT DOCUMENTS

2016/0074985 A1\* 3/2016 Piraube ............ B29D 11/00961
  700/97
2020/0166775 A1\* 5/2020 Ookubo ........... B29D 11/00423

\* cited by examiner

METHOD OF DETERMINING THE POSITION OF AN OPTICAL LENS MEMBER

TECHNICAL FIELD

The present invention relates to a method, for example implemented by computer means, for determining the position of an optical lens member having a surface placed on a lens blocking ring, to a method of manufacturing an optical surface of an optical lens and to an optical lens manufactured by such method.

BACKGROUND OF THE INVENTION

An optical lens is typically made of plastic or glass material and generally has two opposing surfaces which co-operate with one another to provide a required corrective prescription. When the positioning or shape of one of these surfaces with respect to the other is inaccurate, optical errors can be created.

Manufacturing of an optical lens to the required prescription requirements typically includes machining the surface of a semi-finished lens or lens blank. Typically, a semi-finished lens has a finished surface, for example the front surface and an unfinished surface, for example the back surface. By machining the back surface of the lens to remove material, the required shape and positioning of the back surface with respect to the front surface for the desired corrective prescription can be generated.

During manufacturing of the lens, it is important that the semi-finished lens is securely maintained in an accurate position in order to prevent the generation of optical errors. Therefore, the manufacturing method comprises a blocking step during which the semi-finished lens is blocked on a blocker.

During the blocking step, the semi-finished lens is maintained by temporarily clamping the finished surface of the lens on a blocking ring. Various materials may be employed to secure the semi-finished lens to the blocking insert, previously placed below the SF lens. These materials may include low temperature fusible metal alloys and thermoplastic materials.

The position of the optical lens on the blocking ring can be of great importance so as to assure an accurate position of the manufactured surface relative to the finished surface.

In particular when manufacturing an optical lens one may wish to control the prism of the manufactured optical lens. The control of such prism requires controlling accurately the position of the optical lens on the blocking ring.

Furthermore, recent designs of progressive ophthalmic lenses include a combination of two complex surfaces, for example two aspherical surfaces, such as two progressive or regressive surfaces. When combining two complex surfaces, the relative position of both surfaces is of great importance for the optical function of the manufactured ophthalmic lens. Therefore, the semi-finished lens member is to be blocked in an accurate position during the blocking step or at least one needs to be able to determine the blocking position.

A goal of the present invention is to provide a method for determining the position of an optical lens member having a surface placed on a lens blocking ring.

SUMMARY OF THE INVENTION

To this end, the invention proposes a method implemented by computer means, for determining the position of an optical lens member having a surface placed on a lens blocking ring, the blocking ring comprising a bearing zone arranged to bear at least partially a placed known surface of the optical lens member when said known surface of the optical lens member is placed on the lens blocking ring and hold by a force applied on the optical lens member, the method comprises providing a reference system comprising a main axis (Z) perpendicular to a main plane (X, Y) defined by two axes perpendicular to each other and to the main axis (Z), the main axis (Z) corresponding to the main direction of the force applied on the optical lens member; providing blocking ring data representing the bearing zone in the reference system; providing optical lens member surface data representing, in the reference system, the known surface of the optical lens member to be placed on the blocking ring; providing position parameters, the position parameters (TX, TY, RZ) defining a position of a reference point of the known surface with respect to the main plane of the reference system and an orientation, about the main axis of said known surface at said reference point; sampling the bearing zone into a plurality of points, the points being regrouped in a set of trios; selecting a trio of points whose projection on the main plane form a triangle comprising the projection on the main plane of the point of application of force are selected; repositioning the known surface of the optical lens by virtually rotating it about the two perpendicular axes (X, Y) so that the plane formed by the three projected points of the each triple of points on the known surface of the optical lens is parallel to the plan formed by the three projected points of said each triple of points on the ring, and the known surface is virtually translated along the main axis (Z) to have a virtual contact between the tilted surface and the ring at the location of said trios of points form by each triple; repeating the repositioning step for each trio of points, eliminating each trio of points for which the difference in position along the main axis between the points of the blocking ring data and the corresponding points of the known surface of the optical lens is negative, and finally selecting one of the remaining trios as the final trio of point.

Advantageously, the method according to the invention considers the position of the projection on the main plane of the point of application of the force applied to the optical lens member when blocked. Considering the projection of the force provides a more accurate position of the optical lens member than the prior art methods.

Furthermore, the method of the invention can work with all types of surfaces, without requiring to adapt the calculation strategy, and is flexible to adapt to any blocker configuration in term of clamping arm location.

According to further embodiments which can be considered alone or in combination:
 the blocking ring has an axis of symmetry that corresponds to the main axis (Z); and/or
 during the selection step the final trio of points selected is the one of the remaining trios of points corresponding to a position having an orientation parameters (RX, RY) defining the orientation about one of the axis defining the main plan the closest to the average orientation parameter over the positions corresponding to the remaining trios of points; and/or
 the blocking ring is made of three local contact locations, such as pins vertically extruded from the ring reference plane; and/or
 during the sampling step the bearing zone is sampled with a 30° angular sampling; and/or
 the sampling, the trio selection and the repositioning steps are repeated by sampling the bearing zone with a smaller sampling around each of the points of the selected trio of points; and/or when repeating the trio selection and the repositioning steps the sampling is divided by two; and/or the trio selection and the repositioning steps are repeated until the sampling is smaller or equal to 2°; and/or the trio selection and the repositioning steps are repeated until the values of the rotation angles about the two perpendicular axes (X; Y) differ of less than 5% from the values of said rotation angles determined at the previous repetition; and/or the trio selection and the repositioning steps are repeated until the difference in position along the main axis between the points of the blocking ring data and the corresponding points of the known surface of the optical lens is smaller than a threshold value, for example 2 µm, and greater than 0; and/or the bearing zone of the blocking ring has a circular shape; and/or the blocking ring data comprise points spaced by an angular distance greater than or equal to 0.5° and smaller than or equal to 2°; and/or the bearing zone of the blocking ring is comprised in a plane perpendicular to the main axis (Z); and/or the optical lens member surface data is a representation at least twice derivable of the known surface; and/or the known surface is an aspherical surface; and/or the optical lens member is used to manufacture an ophthalmic lens; and/or the ophthalmic lens is a progressive multifocal ophthalmic lens and the reference point of the known surface is the prism reference point of the progressive multifocal ophthalmic lens and/or the known surface is oriented so as to have the near vision part of the progressive multifocal ophthalmic lens facing the bearing zone; and/or the known surface is oriented so as to have the far vision part of the progressive multifocal ophthalmic lens facing the bearing zone; and/or the position parameters are measured on the optical lens member when the optical lens member is placed on the blocking ring.

The invention further relates to a method of manufacturing an optical surface of an optical lens comprising:

an optical lens member providing step, during which an optical lens member having a first optical surface and a second optical surface to be manufactured is provided, a blocking step during which the first surface of the optical lens member is placed on a blocking ring and blocked to a holding lens member, a manufacturing step during which the second surface of the optical lens is manufactured according to manufacturing parameters, wherein the position of the first surface of the optical lens member on the blocking ring at the blocking step is determined using a method according to the invention.

The invention also relates to an optical lens, for example an ophthalmic lens such as a progressive multifocal ophthalmic lens, manufactured according to a manufacturing method of the invention.

According to a further aspect, the invention relates to a computer program product comprising one or more stored sequences of instructions that are accessible to a processor and which, when executed by the processor, causes the processor to carry out the steps of the method according to the invention.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the sense of the invention, a "Design" is a widely used wording known from the man skilled in the art to designate the set of parameters allowing to define an optical function of a generic optical system; each ophthalmic lens manufacturer has its own designs, particularly for aspherical lens and for progressive lens. As for an example, a progressive lens "design" results of an optimization of the progressive surface so as to restore a presbyope's ability to see clearly at all distances but also to optimally respect all physiological visual functions such as foveal vision, extra-foveal vision, binocular vision and to minimize unwanted astigmatisms. Progressive lens "designs" are tested through rigorous clinical trials before being commercialized.

In the context of the present invention the term "optical lens member" can refer to a lens blank, an uncut lens, a semi-finished lens. It will be understood that the method can thus be applied to any stage of the manufacturing process of an ophthalmic lens.

As indicated previously, when one needs to machine a surface of an optical lens one previously to the machining step has the optical lens member blocked on the opposite surface to the surface to be manufactured.

Typically, a method for manufacturing an optical lens comprises:
an optical lens member providing step,
an optical lens member blocking step, and
a machining step.

During the optical lens member providing step, an optical lens member is provided, for example a semi-finished optical lens.

Figure 1A:
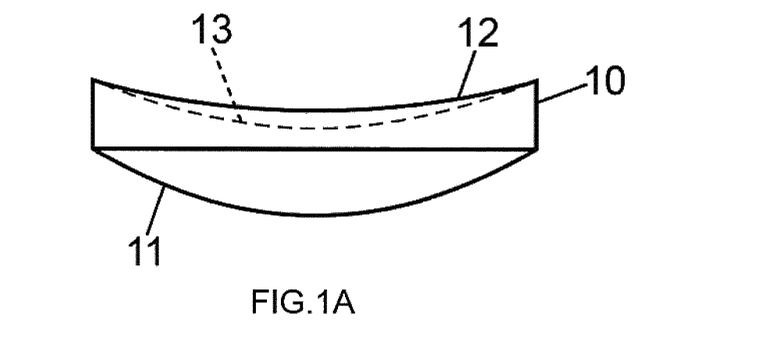
FIG. 1A is a side view of an optical lens member to be manufactured.

As represented on FIG. 1A the optical lens member 10 has a first surface with a first design, for example a preformed aspherical front surface. In use of the resulting finished optical lens, the preformed front surface 11 is disposed nearest the object being viewed. The optical lens member 10 further comprises a second surface 12 to be modified by the manufacturing method so as to provide for example the back surface 13 of the finished optical lens, represented by the dotted line. Second surface 12 is machined by a machining tool so that the back surface 13 is orientated with respect to and distanced from the front surface 11, according to a required optical prescription.

While in this embodiment of the invention, the first surface is the front surface of the lens member and the second surface is the back surface, it will be understood, that in alternative embodiments of the invention the first surface may be the back surface of the lens member and the second surface may be the front surface.

Furthermore, while in this embodiment of the invention, the back surface of the optical lens is formed by the manufacturing method, it will be understood, that in alternative embodiments of the invention both or either surfaces of the lens may be formed by the manufacturing method.

Moreover, although the surface 13 to be manufactured is represented in FIG. 1A as concave, it will be appreciated that this surface 13 could equally well be convex or any other curved surface.

Figure 1B:
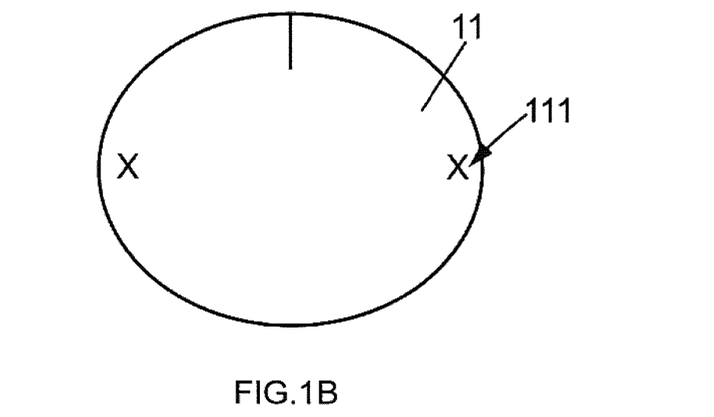
FIG. 1B is a planar top view of a preformed surface of a semi-finished lens member to be machined.

With reference to FIG. 1B, reference markings 111 are provided on the first surface 11 of the lens member 10 as reference features for defining a first reference system for positioning of the first design of the first surface.

The reference markings 111 may be engraved markings having a depth of a few micrometers so as to limit the risk of disturbing the wearer of the resulting finished optical lens. The reference markings may also be temporary markings, for example, using a removable ink. Advantageously, the reference markings 111 are positioned such that they do not appear on resulting finished optical lens after edging operations.

Figure 2:
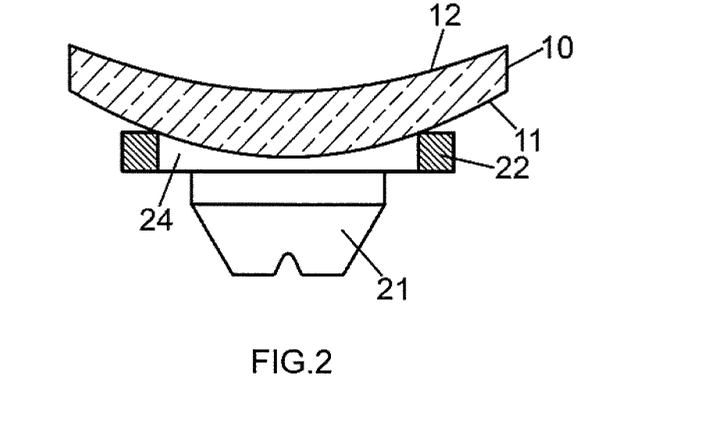
FIG. 2 is a cross-section view of an optical lens member having a surface placed on a blocking ring and attached to a blocking insert according to an embodiment of the invention.

As illustrated on FIG. 2, during the optical lens member blocking step, the first surface 11 of the lens member 10 is placed on a lens blocking ring 22. A blocking cast material is poured in the cavity 24 defined by the first surface 11, the lens blocking ring 22 and a top surface (not represented) of an insert 21.

Although in FIG. 2, the optical lens member 10 is represented as having a first surface 11 that is spherical, the invention is most advantageous for an optical lens member 10 having an aspherical first surface.

Figure 3:
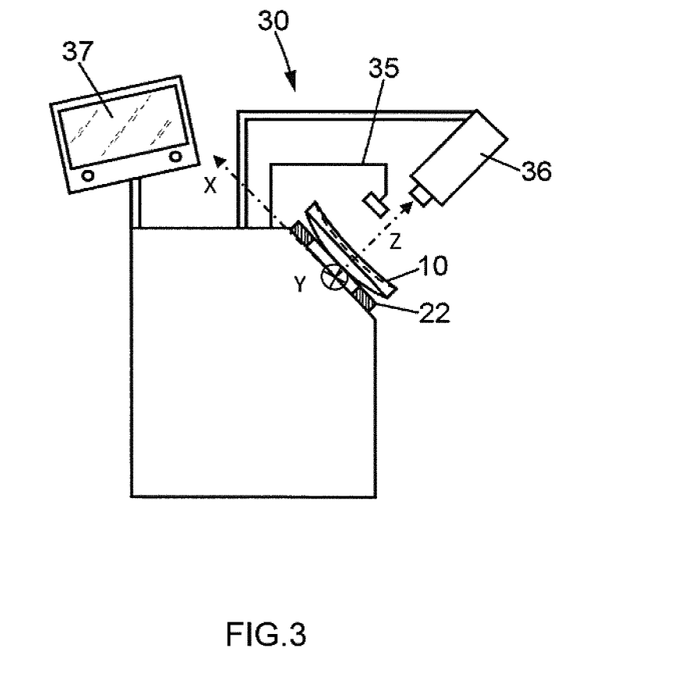
FIG. 3 is schematic view of an optical lens member on a blocking station.

As illustrated on FIG. 3, a blocking station 30 may be used for the optical lens member blocking step. The blocking station 30 comprises a clamping arm 35 which may be moved from a free position to a clamping position in which it holds the lens member 10 in place on the lens blocking ring 22. Blocking station 30 also includes a digital camera 36 for taking an image of the positioning of the lens member 10 on the blocking ring 22, and a screen 37 for viewing the image from the digital camera 36. The lens member 10 may also be directly viewed by an operator without using the digital camera 36.

Once, the operator has positioned the lens member in a predetermined position on the blocking ring the optical lens is clamped using the clamping arm 35. The casting material may then be poured in the cavity 24.

So as to place the lens member in a predetermined position; the operator uses the digital camera and the screen 37 to visualize reference markings on the first surface 11 of the lens member 10. The image of the reference markings 111 on the first surface 11 of the lens member 10 is compared to a computer-generated target on the screen 37. The operator places the lens member so that the image of the reference markings 111 of the first surface 11 of the lens member 10 and the computer-generated target superpose.

Figure 4:
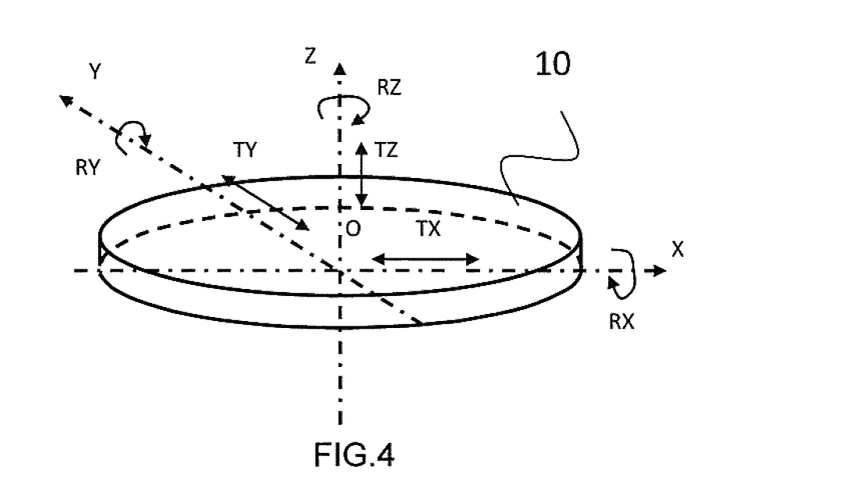
FIG. 4 is a perspective view of a preformed surface of an optical lens member illustrating a reference system and the position parameters.

As illustrated on FIG. 4, the position of the lens member 10 is defined in a reference system comprising a main axis Z perpendicular to a main plane (X, Y) defined by two axes X, Y perpendicular to each other and to the main axis Z. The position of the lens member, in particular of the first surface 11 of the lens member 10 in such reference system is defined by six parameters. Among the six parameters, three are translation parameters TX, TY and TZ along each axis X, Y, and Z and three are rotation parameters RX, RY, and RZ about each of the axis X, Y, and Z. The reference system is also shown on FIG. 3.

When positioning the lens blank on the blocking ring using the blocking station 30, an operator controls only three of the six parameters, i.e. the rotation RZ about the main axis Z and the translations TX and TY along the axis X and Y. Three complementary position parameters TZ, RX and RY are constrained by the shape of the first face and the shape of the bearing zone.

The other three complementary position parameters TZ, RX and RY are to be determined accurately using computer means and an appropriate method. When the placed surface of the optical lens member is aspherical the three rotation parameters are of great importance.

The method of the invention is such an appropriate method.

The method of the invention may be implemented by computer means and comprises finding a trio of points of the bearing zone that forms a triangle comprising the projection on the main plane of the point of application of said force; and a position of the optical lens having a virtual contact between the placed known surface and the ring at the location of said trios of points.

Figure 5:
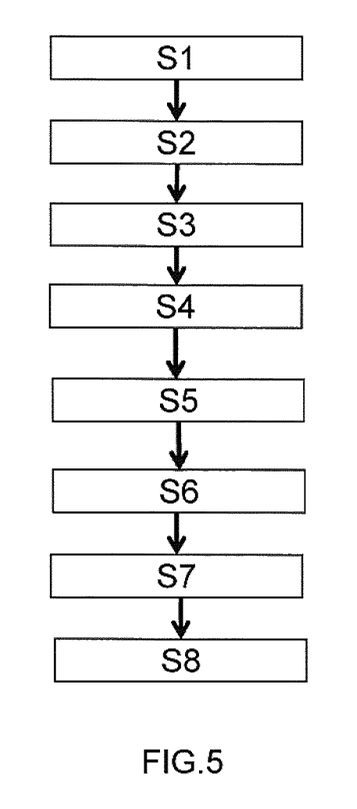
FIG. 5 is a flowchart of the steps of a method according to the invention.

As illustrated on FIG. 5, according to an embodiment of the invention the method according to the invention comprises:
a reference system providing step S1,
a blocking ring data providing step S2,
an optical lens member surface data providing step S3,
a position parameters providing step S4,
a sampling step S5,
a trio selection step S6,
a repositioning step S7, and
a selection step S8

During the reference system providing step S1, a reference system comprising a main axis (Z) perpendicular to a main plane (X, Y) is provided. The main plane (X,Y) is defined by two axes perpendicular to each other and to the main axis (Z). The center (O) of such reference system is defined as the intersection point of the main axis (Z) with the main plane (X, Y).

The main axis (Z) corresponds to the main direction of the force applied on the optical lens member, for example by the clamping arm 35.

During the blocking ring data providing step S2, blocking ring data is provided. The blocking ring data represents at least the bearing zone of the blocking in the reference system. The bearing zone is the part of the blocking ring arranged to bear at least partially the placed known surface of the optical lens member.

Different type of blocking ring may be used during the optical lens member blocking step.

As disclosed in U.S. Pat. No. 4,714,232 the blocking ring may be in the form of a bearing ring having three bearing areas for contact with a semi-finished blank arranged circumferentially around an axis and at the vertices of an isosceles triangle, each bearing area having a plurality of facets which conjointly form a globally convex combination.

Although this solution minimizes the risk associated with the appearance of prism during positioning of the semi-finished blank, the risk is not eliminated entirely and producing such type of blocking ring is very expensive.

Another type of blocking ring comprises three pegs, each peg having a cylindrical body that is extended by a spherical surface head. The first surface of the optical lens is placed on the spherical surface heads. The use of such blocking ring combined with an appropriate method provides a good control of the blocking position of the optical lens member. However, such blocking ring remains expensive to produce.

Figure 6:
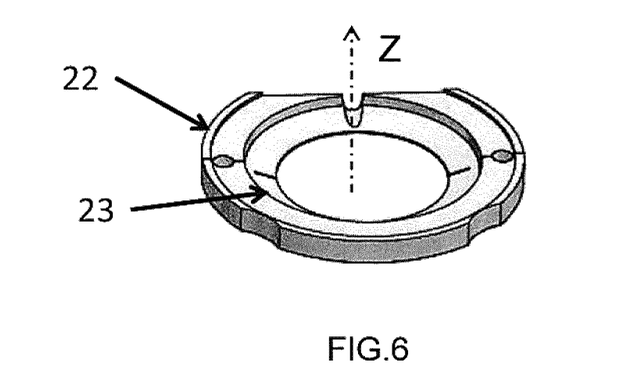
FIG. 6 is a perspective view of an annular blocking ring.

As represented on FIG. 6, a production blocking ring may simply comprise an annular bearing zone 23 having globally a circular symmetry about an axis Z. The bearing zone is arranged to bear at least partially the placed surface of the optical lens member when said optical lens member is placed on the blocking ring.

According to an embodiment of the invention, the bearing zone is located within the main plane and the center of the reference system is located at a geometrical center of the bearing zone 23.

According to an embodiment of the invention, the blocking ring has a cylinder shape whose revolution axis is parallel to the main axis (Z). The blocking ring may have a constant height along the main axis. The shapes of the blocking rings tend to be as simple as possible so as to reduce the cost of such blocking ring.

When the lens member is clamped against the lens blocking ring, only part of the blocking ring is in contact with the places known surface of the lens member.

Indeed, the clamping arm 35 of the blocking station usually has an offset, i.e. the point of the second surface of the lens member where the clamping arm is clamped does not correspond to the center of the lens member and the placed known surface of the lens member is usually asymmetric.

Therefore, the bearing zone may represent only part of the surface of the blocking ring: the part that is to be in contact with the placed known surface of the lens member.

As represented on FIG. 6, according to an embodiment of the invention, the bearing zone 23 has a circular shape and may be comprised in a plane perpendicular to the main axis (Z).

According to an embodiment of the invention, the bearing zone data represent an arc of the blocking ring, the arc having an angle greater than or equal to 60°, for example greater than or equal to 120°, for example greater than 170°, and smaller than or equal to 300°, for example smaller than or equal to 240°, for example smaller than 190°. The summit of the arc is positioned at the geometrical center of the bearing zone.

The blocking ring data comprises data representing, in the reference system provided during the reference system providing step, a plurality of point of the bearing zone. The plurality of points comprises at least three points, for example at least 10 points, for example the blocking ring data comprise one point per degrees over the bearing area.

According to an embodiment, the blocking ring data comprise points arranged so as they are spaced by an angular distance greater than or equal to 0.5° and smaller than or equal to 2°. The reference of the angles is the center of the blocking ring.

During the optical lens member surface data providing step S3, optical lens member surface data are provided. The optical lens member surface data represent the known surface of the optical lens to be placed on the blocking ring. The optical lens member surface data are expressed in the reference system.

For example, the optical lens member surface data represent the first surface 11 of the lens member 10. According to an embodiment of the invention, the optical lens member surface data is a representation at least twice derivable of the placed surface of the optical lens member. The optical lens surface member surface data may be a surface function representation of the optical surface, using for example NURBS representations, i.e. Non-Uniform Rational Basis Splines.

As indicated previously, according to an embodiment of the invention, the placed surface may be asymmetric, for example aspherical.

During the position parameters providing step S4, position parameters of the placed surface are provided. The position parameters define the position of a reference point of the surface of the optical lens to be placed on the blocking ring in the main plane of the reference system and the orientation of said surface about the main axis of the reference system. The position parameters correspond to the parameters the operator may control when placing the lens member on the blocking ring, i.e. the rotation RZ about the main axis Z and the translations TX and TY along the axis X and Y. RX, RY and TZ are controlled through the clamping arm and contact with the blocking ring, and TX, TY and RZ are controlled by an operator by aligning a reference point of the first surface on a reference marks located on the blocking station.

According to an embodiment of the invention, the optical lens member is used to manufacture an ophthalmic lens.

The reference point of the surface of the optical lens member to be placed on the center of the blocking ring may be any point of the surface, for example when the optical lens is a progressive ophthalmic lens, the reference point is the prism reference point. However, the geometrical center of the first surface or the barycenter of the first surface can be used as reference point.

During the sampling step S5, the bearing zone is sampled into a plurality of points, the points being regroup in a set of trios.

For example, the bearing zone is sampled with a 30° angular sampling. When the bearing zone is annular such sampling defines 12 points equally distributed.

During the trio selection step S6 trios of points whose projection on the main plane form a triangle are selected.

According to the embodiment of a sampling with a 30° angular sampling these forms 220 trio of points.

During the trio selection step, only the trios of points forming a triangle comprising the projection on the main plane of the point of application of force are selected.

The method of the invention may comprise an initial position determining step S6b during which the position of the placed surface of the optical lens member is determined. In other words, using the optical lens member surface data, the blocking ring data and the position parameter, an initial position of the placed surface of the optical lens member relative to the blocking ring is determined.

For example, the blocking ring is placed in the main plane (X,Y) and perpendicular to the main axis Z. The placed surface is placed relatively to the blocking ring according to the three positioning parameters. The three other parameters TZ, RX, and RY may be given an arbitrary value under the condition that the placed surface of the optical lens is above the blocking ring.

According to an embodiment of the invention, the optical lens is a progressive multifocal ophthalmic lens and during the initial positioning step, the placed surface is oriented so as to have the near vision part of the progressive multifocal ophthalmic lens facing the at least part of the surface of the blocking ring. In other words, the parameter corresponding to the rotation about the main axis Z is so that the placed surface is oriented so as to have the near vision part of the progressive multifocal ophthalmic lens facing the bearing zone of the blocking ring. According to such embodiment, the optical lens may be placed so that the clamping arm in the clamping position pushes against the near vision part of the progressive multifocal ophthalmic lens.

According to an embodiment of the invention, the optical lens is a progressive multifocal ophthalmic lens and during the initial positioning step, the placed surface is oriented so as to have the far vision part of the progressive multifocal ophthalmic lens facing the at least part of the surface of the blocking ring. In other words, the parameter corresponding to the rotation about the main axis Z is so that the placed surface is oriented so as to have the far vision part of the progressive multifocal ophthalmic lens facing the bearing zone of the blocking ring. According to such embodiment, the optical lens may be placed so that the clamping arm in the clamping position pushes against the far vision part of the progressive multifocal ophthalmic lens. Since the far vision part of the progressive multifocal ophthalmic lens has a surface close to a sphere, the contact between the optical surface and the blocking ring is easier and the risk of a having some of the cast material leaking during the blocking steps is reduced.

During the repositioning step S7, the known surface of the optical lens is virtually rotated about the two perpendicular axes (X; Y) so that the plane formed by the three projected points of the each triple of points on the known surface of the optical lens is parallel to the plan formed by the three projected points of said each triple of points on the ring, and the known surface is virtually translated along the main axis (Z) to have a virtual contact between the tilted surface and the ring at the location of said trios of points.

Here, by "virtually", one intends "by calculations performed for example by computer means".

During the selection step the repositioning step is repeated for each trio of points, eliminating each trio of points for which the difference in position along the main axis between the points of the blocking ring data and the corresponding points of the known surface of the optical lens is negative, and finally selecting one of the remaining trios as the final trio of point.

In other words, no collision between the known surface of the optical lens member and the ring is accepted, i.e. no point of the known surface is to be below a point of the ring.

The final trio of points may be selected as being the one of the remaining trios of points corresponding to a position having an orientation parameters (RX, RY) defining the orientation about one of the axis defining the main plan the closest to the average orientation parameter over the positions corresponding to the remaining trios of points.

For example, for each remaining trios of points the orientation parameters RX and RY of the corresponding position are calculated. The orientation parameter having the greatest amplitude among the remaining trio of points is selected.

The final trio of points is selected among the remaining trios of points corresponding to a position having the selected orientation parameter the closest from the average value of said selected orientation parameter over the positions corresponding to the remaining trio of points.

Once the trio of points that minimizes the difference in position along the main (Z) has been determined, the values of the position parameters TZ, RX, and RY combined with the values of the position parameters RZ, TX and TY, allows calculating an accurate position for the placed surface with respect to the blocking ring and then to the lens blocker. Thus, when machining the second surface of the optical lens member, the positioning errors between the two optical surfaces of the lens can be reduced, because the position of first surface was better anticipated in the calculation.

Advantageously, the overall accuracy of the manufacturing method is increased.

According to an embodiment of the invention, the sampling, the trio selection and the repositioning steps may be repeated by sampling the bearing zone with a smaller sampling around each of the points of the selected trio of points.

For example, when repeating the trio selection and the repositioning steps the sampling is divided by two.

According to such embodiment, the optimization of the method of the invention may be stopped when sampling is smaller or equal to 2°. In other words, the trio selection and the repositioning steps are repeated until the sampling is smaller or equal to 2°.

The method of the invention may also be carried out until the values of the rotation angles about the two perpendicular axes (X; Y) differ of less than 5% from the values of said rotation angles determined at the previous repetition.

Although the stop criteria are described as independent the method of the invention may be stopped when the one of the two criteria is reached, i.e. sampling smaller or equal to 2° and the values of the rotation angles about the two perpendicular axes (X; Y) differ of less than 5% from the values of said rotation angles determined at the previous repetition.

Although presented as an iterative process, it will be appreciated that optimization used in the method of the invention may be of any type known of the person skilled in the art.

While the foregoing examples have been described with reference to the manufacture of an ophthalmic lens, it will be appreciated that the method of the invention may be applied more generally to the manufacture of other types of optical lens, for example optical lens used in telescopes and the like, or contact lens.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by a computer, for determining a position of an optical lens member having a surface placed on a lens blocking ring that includes a bearing zone configured to at least partially bear on a placed known surface of the optical lens member when said known surface of the optical lens member is placed on the lens blocking ring and held by a force applied on the optical lens member, the optical lens member including another surface to be machined, the method comprising:
   providing a reference system including a main axis perpendicular to a main plane defined by two axes perpendicular to each other and to the main axis, the main axis corresponding to a main direction of the force applied on the optical lens member;
   providing blocking ring data representing the bearing zone in the reference system;
   providing optical lens member surface data representing, in the reference system, the known surface of the optical lens member to be placed on the blocking ring;
   providing position parameters defining a position of a reference point of the known surface with respect to the main plane of the reference system and an orientation, about the main axis of said known surface at said reference point;
   sampling the bearing zone into a plurality of points, the points being regrouped in a set of trios;
   selecting trios of points whose projection on the main plane forms a triangle comprising the projection on the main plane of the point of application of force;
   repositioning the known surface of the optical lens by virtually rotating the known surface about the two perpendicular axes so that the plane formed by the three projected points of each of the triple of points on the known surface of the optical lens is parallel to the plan formed by the three projected points of each of the triple of points on the ring, and virtually translating the known surface along the main axis to have a virtual contact between the tilted surface and the ring at the location of said trios of points;
   repeating the repositioning for each trio of points, eliminating each trio of points for which the difference in position along the main axis between the points of the blocking ring data and the corresponding points of the known surface of the optical lens is negative, and then selecting one of the remaining trios as the final trio of points;
   blocking the optical lens member by placing the known surface of the optical lens member on a blocking ring and blocking the optical lens member to a holding lens member, a position of the known surface of the optical lens member on the blocking ring being determined using the selected final trio of points; and
   manufacturing the other surface to be machined after the optical lens member is blocked on the blocking ring.

2. The method according to claim 1, wherein the blocking ring has an axis of symmetry that corresponds to the main axis.

3. The method according to claim 2, wherein, during the sampling, the bearing zone is sampled with a 30° angular sampling.

4. The method according to claim 3, wherein, during the sampling, the trio selecting and the repositioning are repeated by sampling the bearing zone with a smaller sampling around each of the points of the selected trio of points.

5. The method according to claim 3, wherein the blocking ring data comprise points spaced by an angular distance greater than or equal to 0.5° and smaller than or equal to 2°.

6. The method according to claim 2, wherein, during the sampling, the trio selecting and the repositioning are repeated by sampling the bearing zone with a smaller sampling around each of the points of the selected trio of points.

7. The method according to claim 2, wherein the blocking ring data comprise points spaced by an angular distance greater than or equal to 0.5° and smaller than or equal to 2°.

8. The method according to claim 1, wherein, during the sampling, the trio selecting and the repositioning are repeated by sampling the bearing zone with a smaller sampling around each of the points of the selected trio of points.

9. The method according to claim 8, wherein, when repeating the trio selecting and the repositioning, the sampling is divided by two.

10. The method according to claim 9, wherein the trio selecting and the repositioning are repeated until the sampling is smaller or equal to 2°.

11. The method according to claim 9, wherein the trio selecting and the repositioning are repeated until the values of the rotation angles about the two perpendicular axes differ by less than 5% from the values of said rotation angles determined at the previous repetition.

12. The method according to claim 8, wherein the trio selecting and the repositioning are repeated until the sampling is smaller or equal to 2°.

13. The method according to claim 12, wherein the trio selecting and the repositioning are repeated until the values of the rotation angles about the two perpendicular axes differ by less than 5% from the values of said rotation angles determined at the previous repetition.

14. The method according to claim 8, wherein the trio selecting and the repositioning are repeated until the values of the rotation angles about the two perpendicular axes differ by less than 5% from the values of said rotation angles determined at the previous repetition.

15. The method according to claim 1, wherein the blocking ring data comprise points spaced by an angular distance greater than or equal to 0.5° and smaller than or equal to 2°.

16. The method according to claim 1, wherein the bearing zone of the blocking ring is comprised in a plane perpendicular to the main axis.

17. The method according to claim 1, wherein the optical lens member is used to manufacture a progressive multifocal ophthalmic lens and the reference point of the known surface is a prism reference point of the progressive multifocal ophthalmic lens.

18. The method according to claim 17, wherein the known surface is oriented to have the near vision part of the progressive multifocal ophthalmic lens facing the bearing zone.

19. The method according to claim 17, wherein the known surface is oriented to have the far vision part of the progressive multifocal ophthalmic lens facing the bearing zone.

\* \* \* \* \*